(12) United States Patent
Walster

(10) Patent No.: US 7,289,122 B1
(45) Date of Patent: Oct. 30, 2007

(54) METHOD AND APPARATUS FOR APPROXIMATING AN ARBITRARY SHAPE WITH A CLOSED BEZIER CURVE

(75) Inventor: G. William Walster, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 415 days.

(21) Appl. No.: 11/020,967

(22) Filed: Dec. 22, 2004

(51) Int. Cl.
*G06T 11/20* (2006.01)
(52) U.S. Cl. ........................ 345/441; 345/467
(58) Field of Classification Search ............... None
See application file for complete search history.

(56) References Cited

U.S. PATENT DOCUMENTS 6,678,881 B2 * 1/2004 Graham .................... 717/116
6,792,071 B2 * 9/2004 Dewaele .................... 378/62

* cited by examiner

*Primary Examiner*—Kee M. Tung
*Assistant Examiner*—Michelle K Lay
(74) *Attorney, Agent, or Firm*—Park, Vaughan & Fleming LLP

(57) ABSTRACT

One embodiment of the present invention provides a system that approximates a shape of an object with a closed Bezier curve. During operation, the system receives a specification for the shape of the object. The system also produces an objective function for the area of a closed Bezier curve, wherein the objective function expresses the area of the closed Bezier curve as a function of the locations of control points that define the closed Bezier curve. Next, the system uses the specification for the shape of the object to generate exterior constraints for the closed Bezier curve, wherein the exterior constraints ensure that the closed Bezier curve remains on the exterior of the object. Finally, the system minimizes the area of the closed Bezier curve subject to the exterior constraints to produce a minimum-area closed Bezier curve on the exterior of the object which encloses the shape of the object.

20 Claims, 4 Drawing Sheets

METHOD AND APPARATUS FOR APPROXIMATING AN ARBITRARY SHAPE WITH A CLOSED BEZIER CURVE

BACKGROUND

The present invention relates to techniques for representing shapes within computer graphics systems.

Bezier curves (which are parameterized polynomials) and ratios of them (Non-Uniform Rational B-splines) called NURBs, are used extensively in computer graphics, rendering and mechanical computer-aided design (MCAD). For example, ship hulls, airplane skins and car bodies are typically defined using two-dimensional and three-dimensional generalizations of Bezier curves and NURBs.

Bezier curves are useful in practice because the shape of the Bezier curve is intuitively linked to the location of control points. Thus, people can manually adjust the location of control points using a computer-based graphical interface to create a curve that approximates a desired shape. At present, much of the design work involving Bezier curves and NURBs involves hand-crafting control points to approximate a desired shape. This can be an extremely tedious and time consuming process, especially in situations where a large number of shapes must be approximated. For example, during the process of designing a scalable font, it is typically necessary to approximate an artist's rendering of each character in the font with a parameterized polynomial so that that characters can be scaled to different sizes. At the moment, this process must be performed manually for each character, because there is presently no automatic way to approximate an arbitrary shape with a closed Bezier curve.

SUMMARY

One embodiment of the present invention provides a system that approximates a shape of an object with a closed Bezier curve. During operation, the system receives a specification for the shape of the object. The system also produces an objective function for the area of a closed Bezier curve, wherein the objective function expresses the area of the closed Bezier curve as a function of the locations of control points that define the closed Bezier curve. Next, the system uses the specification for the shape of the object to generate exterior constraints for the closed Bezier curve, wherein the exterior constraints ensure that the closed Bezier curve remains on the exterior of the object. Finally, the system minimizes the area of the closed Bezier curve subject to the exterior constraints to produce a minimum-area closed Bezier curve on the exterior of the object which encloses the shape of the object.

In a variation on this embodiment, the system also uses the specification for the shape of the object to generate interior constraints for the closed Bezier curve, wherein the interior constraints ensure that the closed Bezier curve remains on the interior of the object. Next, the system maximizes the area of the closed Bezier curve subject to the interior constraints to produce a maximum-area closed Bezier curve on the interior of the object which is enclosed by the shape of the object.

In a variation on this embodiment, minimizing the area of the closed Bezier curve involves feeding the objective function and the exterior constraints into an optimization module.

In a further variation, the optimization module uses interval-arithmetic-based techniques to solve constrained nonlinear optimization problems.

In a variation on this embodiment, producing the objective function involves choosing an initial number of control points for the closed Bezier curve. In this embodiment, minimizing the area of the closed Bezier curve involves increasing the number of control points until a termination condition is satisfied.

In a further variation, the termination condition is satisfied when the difference between the area of the minimum-area closed Bezier curve on the exterior of the object and the area of a maximum-area closed Bezier curve on the interior of the object falls below an acceptable difference, or when the optimization program has performed a maximum amount of computational work without the difference in areas falling below the acceptable difference.

In a variation on this embodiment, the closed Bezier curve is described by parametric equations for x, y (and possibly z) coordinates of the closed Bezier curve (or surface).

In a variation on this embodiment, generating the constraints additionally involves generating higher-order derivative constraints to achieve derivative continuity or smoothness in the resulting closed Bezier curve.

In a variation on this embodiment, receiving the specification for the shape of the object involves receiving: a pixilated representation of the object; an artists rendering of the object, which has been digitized; or a piecewise analytic function defining the boundary of the object.

Table 1 presents indices required for nonzero beta function values in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Computer System

Figure 1:
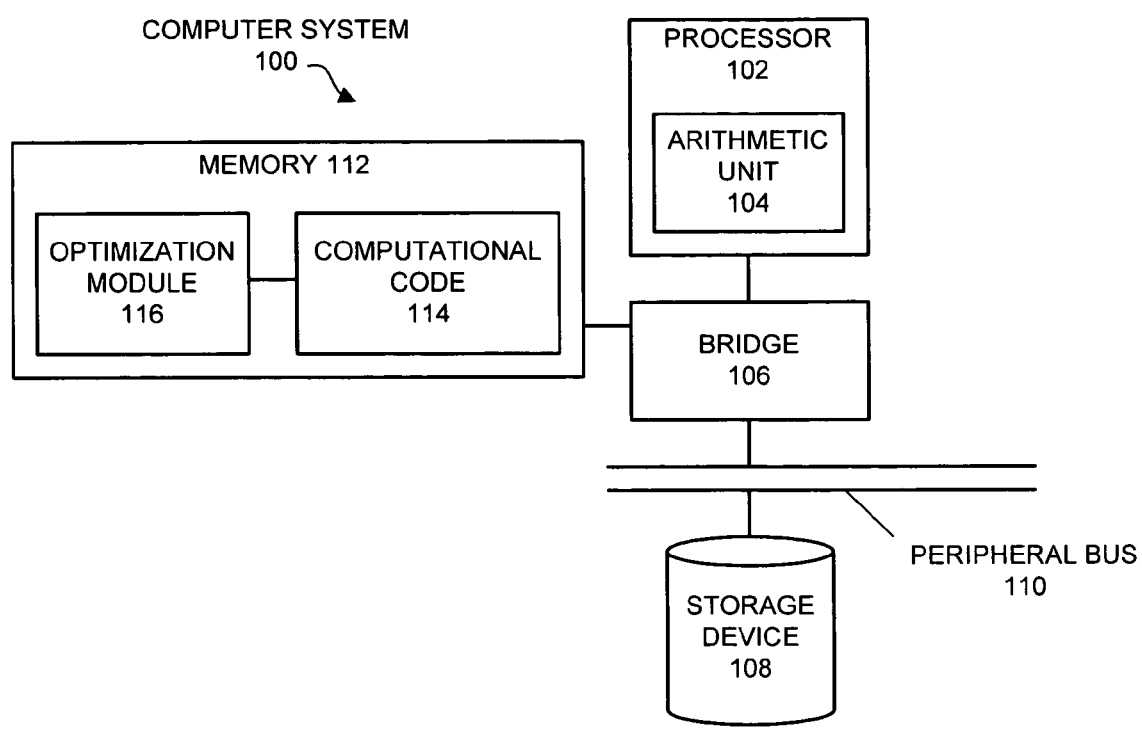
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code 114. Computational code 114 contains instructions that perform computational operations involving Bezier curves, NURBs, or other types of parameterized polynomials which define shapes.

Memory 112 also contains optimization module 116, which contains code that solves constrained nonlinear optimization problems. Techniques for solving constrained nonlinear optimization problems are well-known in the art. For example, interval techniques for solving generalized optimization problems are discussed in a book entitled, "Global Optimization Using Interval Analysis," by Eldon Hansen, published by Marcel Dekker, Inc., 1992, which is hereby incorporated by reference. Other non-interval optimization techniques can be used as well.

Note that although the present invention is described in the context of computer system 100 illustrated in FIG. 1, the present invention can generally operate on any type of computing device that can perform computations. Hence, the present invention is not limited to the computer system 100 illustrated in FIG. 1.

Approximating the Shape of an Object with a Closed Bezier Curve

Figure 2:
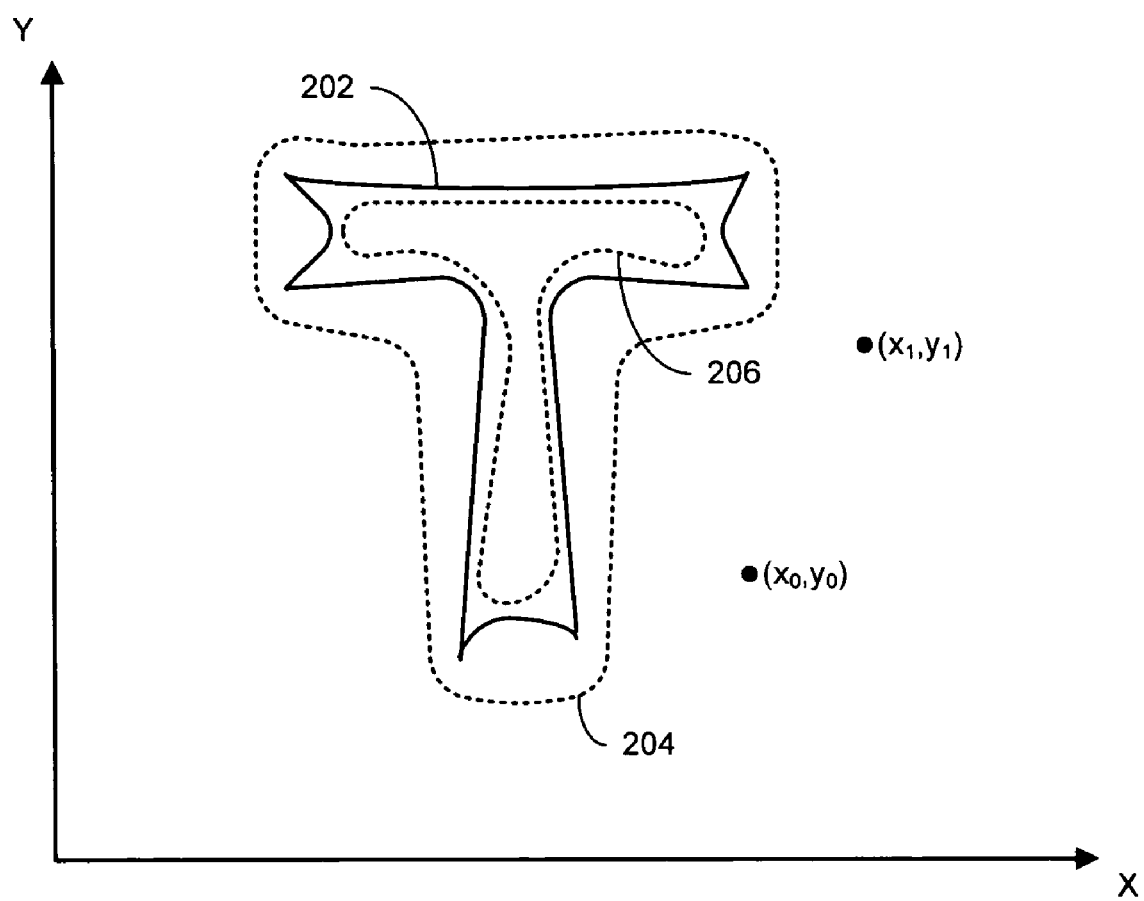
FIG. 2 illustrates an object with an exterior closed Bezier curve and an interior closed Bezier curve in accordance with an embodiment of the present invention.

FIG. 2 illustrates an object 202 with an exterior closed Bezier curve 204 and an interior closed Bezier curve 206 in accordance with an embodiment of the present invention. During operation, the system adjust the location of control points (such as control points $(x_0, y_0)$ and $(x_1, y_1)$) to minimize the area of the closed Bezier curve 204 subject to the exterior constraints to produce a minimum-area closed Bezier 204 curve on the exterior of object 202 which encloses the shape of object 202. The system also maximizes the area of the closed Bezier curve 206 subject to the interior constraints to produce a maximum-area closed Bezier curve 206 on the interior of object 202 which is enclosed by the shape of object 202. This process is described in more detail below.

Process of Optimizing the Location of Bezier Control Points

Figure 3:
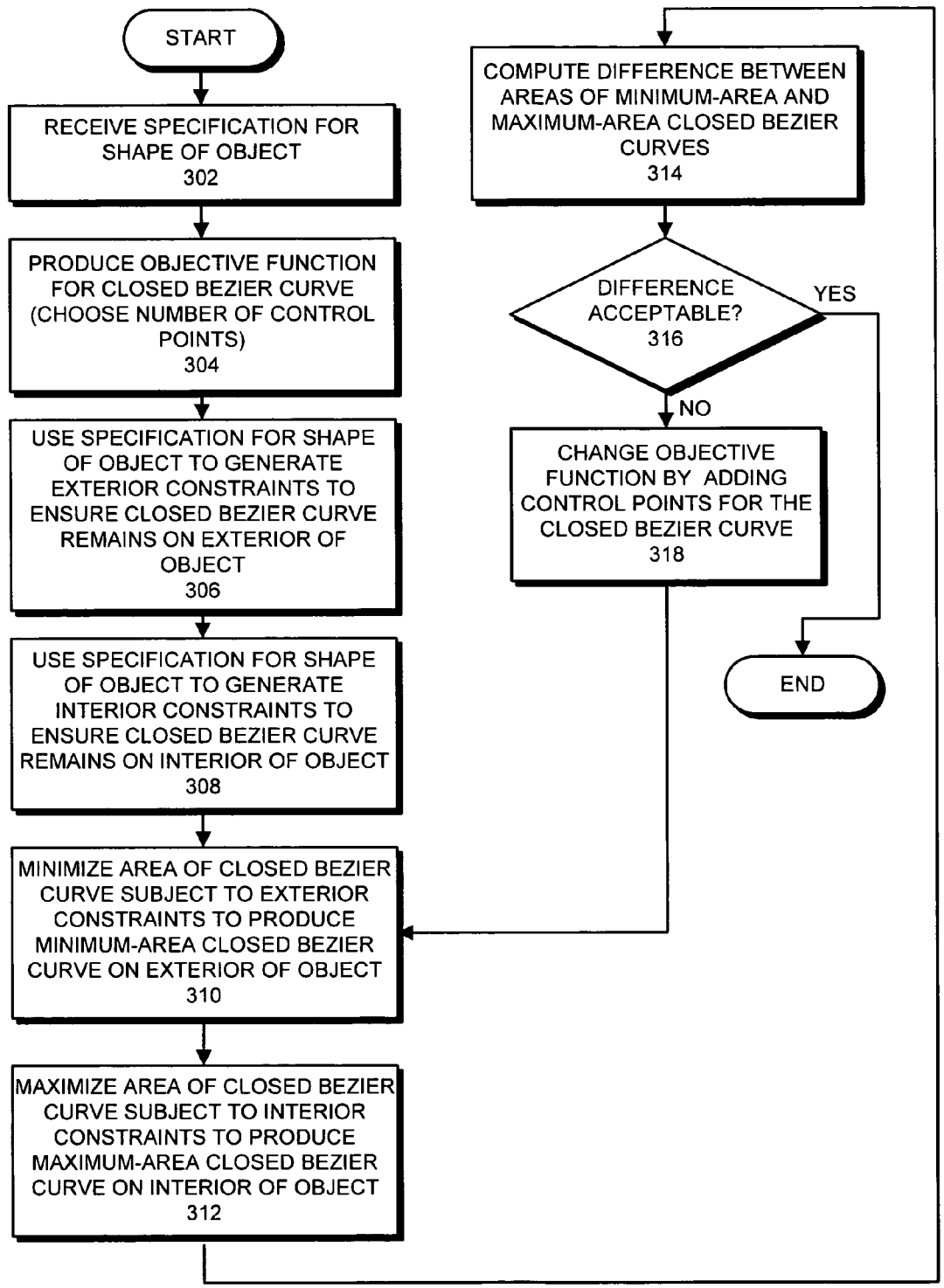
FIG. 3 presents a flow chart illustrating the process of optimizing the location of Bezier control points in accordance with an embodiment of the present invention.

FIG. 3 presents a flow chart illustrating the process of optimizing the location of Bezier control points in accordance with an embodiment of the present invention. First, the system starts by receiving a specification for the shape of the object (step 302). This specification can include: a pixilated representation of the object; an artists rendering of the object, which has been digitized; or a piecewise analytic function defining the boundary of the object.

Figure 4:
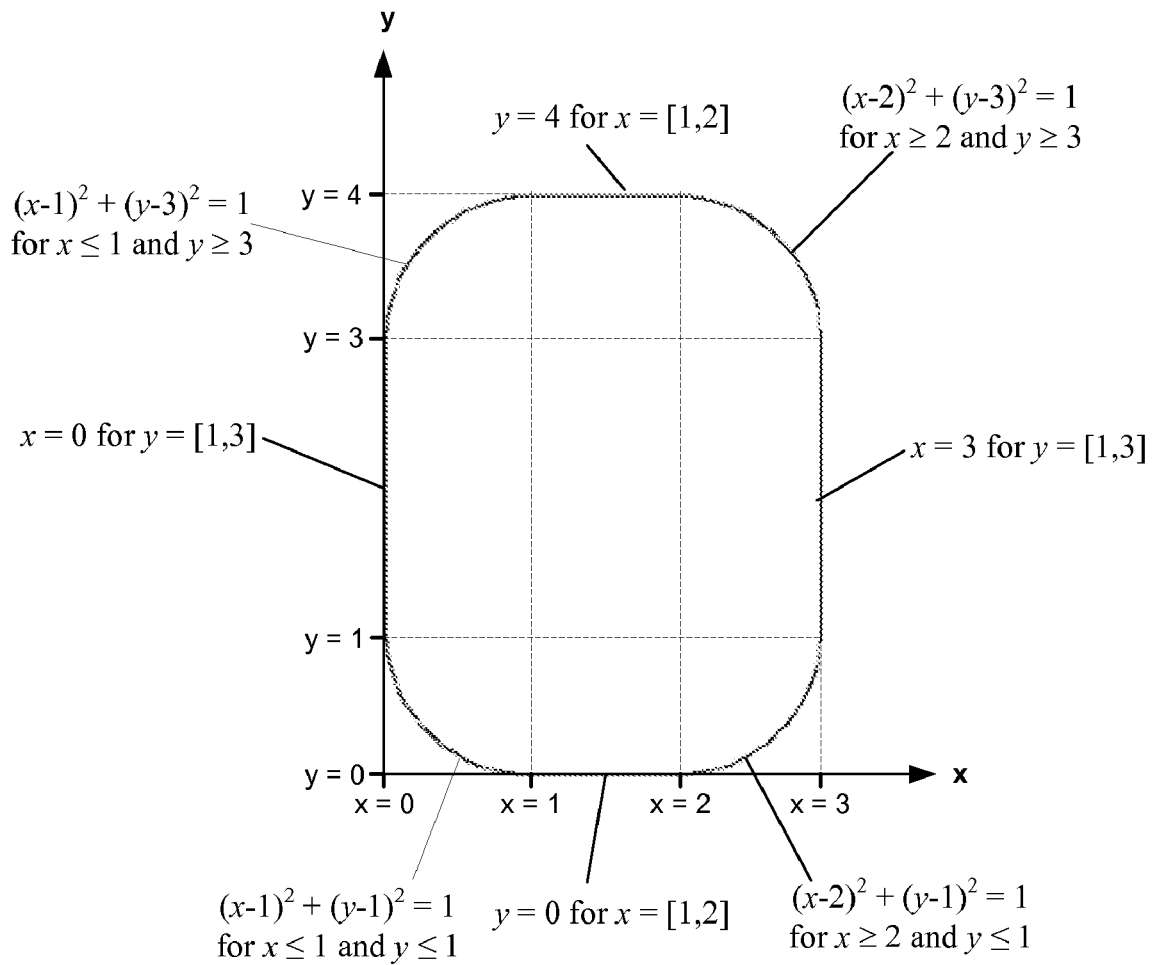
FIG. 4 presents an example illustrating how a piecewise analytic function can define the boundary of an object.

For an example of how a piecewise analytic function can be used to define a boundary of an object, please see FIG. 4, which illustrates the boundary generated by following piecewise analytic function:

$(x-2)^2 + (y-3)^2 = 1$ for $x \geq 2$ and $y \geq 3$;

$(x-1)^2 + (y-1)^2 = 1$ for $x \leq 1$ and $y \leq 1$;

$(x-1)^2 + (y-3)^2 = 1$ for $x \leq 1$ and $y \geq 3$;

$(x-2)^2 + (y-1)^2 = 1$ for $x \geq 2$ and $y \leq 1$;

$y = 4$ for $x = [1, 2]$;

$y = 0$ for $x = [1, 2]$;

$x = 0$ for $y = [1, 3]$; and $x = 3$ for $y = [1, 3]$.

Next, the system produces an objective function for the area of a closed Bezier curve, wherein the objective function expresses the area of the closed Bezier curve in terms of the locations of control points that define the closed Bezier curve (step 304). Note that while producing the objective function, the system also chooses an initial number of control points for the closed Bezier curve.

Next, the system uses the specification for the shape of object 202 to generate exterior constraints for the closed Bezier curve, wherein the exterior constraints ensure that the closed Bezier curve remains on the exterior of the object (step 306).

The system also uses the specification for the shape of the object 202 to generate interior constraints for the closed Bezier curve, wherein the interior constraints ensure that the closed Bezier curve remains on the interior of the object (step 308).

Next, the system minimizes the area of the closed Bezier curve 204 subject to the exterior constraints to produce a minimum-area closed Bezier curve on the exterior of object 202 which encloses the shape of object 202 (step 310).

The system also maximizes the area of the closed Bezier curve 206 subject to the interior constraints to produce a maximum-area closed Bezier curve on the interior of the object which is enclosed by the shape of the object (step 312).

Next, the system computes the difference between the minimum internal area and maximum external area of the closed Bezier curves (step 314). The system then determines if a given termination condition is satisfied (step 316). In one embodiment of the present invention, this termination condition is satisfied if the difference falls below a predetermined acceptable difference, or if the optimization program has performed a maximum amount of computational work without the difference in areas falling below the acceptable difference. If the termination condition is satisfied, the process terminates. Otherwise, the system changes the objective function by increasing the number of control points (step 318). The system then returns to step 310 to re-compute the minimum-area closed Bezier curve on the exterior of the object, and the maximum-area closed Bezier curve on the interior of the object. Note that by cycling through this loop (through steps 310, 312, 314, 316 and 318), the system increases the number of control points until the termination condition is satisfied.

Producing the Objective Function

The objective function of the area of a closed Bezier curve can be produced as follows. We denote the Bernstein basis or blending function by:

$$J(n, i, t) = \binom{n}{i} t^i (1-t)^{n-i} \quad (1)$$

Where $$\binom{n}{i} = \frac{n!}{i!(n-i)!}$$

Changing the index i to k and differentiating with respect to t:

$$\frac{d}{dt} J(n, k, t) = \binom{n}{k}(1-t)^{n-k}\left(\frac{t^{k-1}k - t^k n}{1-t}\right) \quad (2)$$

$$= (k - nt)\binom{n}{k} t^{k-1}(1-t)^{n-k-1}. \quad (3)$$

This result is used below.

The parameterized Bezier curve x and y components are defined:

$$P_x(t) = \sum_{i=0}^{n} x_i J(n, i, t) \quad (4)$$

$$P_y(t) = \sum_{k=0}^{n} y_k J(n, k, t) \quad (5)$$

The goal is to compute the area enclosed by a closed Bezier curve in which the control points $(x_0, y_0) = (x_n, y_n)$. From Greer's formula $$A = \int_0^1 P_x(t)\left(\frac{d}{dt} P_y(t)\right) dt \quad (6)$$

$$= \int_0^1 \sum_{i=0}^{n} x_i J(n, i, t) \left(\frac{d}{dt} \sum_{k=0}^{n} y_k J(n, k, t)\right) dt \quad (7)$$

$$= \int_0^1 \sum_{i=0}^{n} x_i \binom{n}{i} t^i (1-t)^{n-i}$$

$$\left(\sum_{k=0}^{n} y_k (k - nt) \binom{n}{k} t^{k-1}(1-t)^{n-k-1}\right) dt \quad (8)$$

-continued $$= \sum_{i=0}^{n} x_i \binom{n}{i} \left(\sum_{k=0}^{n} y_k \binom{n}{k} \int_0^1 (k - nt) t^{i+k-1}(1-t)^{2n-i-k-1} dt\right). \quad (9)$$

So, the fundamental integral is $$\int_0^1 (k - nt) t^{i+k-1}(1-t)^{2n-i-k-1} dt \quad (10)$$

where $0 \leq i \leq n$ and $0 \leq k \leq n$.

$$\int_0^1 (k - tn) t^{i+k-1}(1-t)^{2n-i-k-1} dt \quad (11)$$

$$= k \int_0^1 t^{i+k-1}(1-t)^{2n-i-k-1} dt - n \int_0^1 t^{i+k}(1-t)^{2n-i-k-1} dt \quad (12)$$

$$= kB(i+k, 2n-i-k) - kB(i+k+1, 2n-i-k) \quad (13)$$

$$B(i+k, 2n-i-k) = \frac{\Gamma(2n)}{\Gamma(i+k)\Gamma(2n-i-k)} \quad (14)$$

$$= \frac{(2n-1)!}{(i+k-1)!(2n-i-k-1)!} \quad (15)$$

$$B(i+k+1, 2n-i-k) = \frac{\Gamma(2n+1)}{\Gamma(i+k+1)\Gamma(2n-i-k)} \quad (16)$$

$$= \frac{(2n)!}{(i+k)!(2n-i-k-1)!} \quad (17)$$

Therefore $$A = \sum_{i=0}^{n} x_i \binom{n}{i}\left(\sum_{k=0}^{n} y_k \binom{n}{k}(kB(i+k, 2n-i-k) - nB(i+k+1, 2n-i-k))\right) \quad (18)$$

For some values of i+k, the beta function coefficients are zero. To recursively compute these functions, initial values must be non-zero. The following table shows the required values of i+k to achieve this.

TABLE 1

| i + k | B(i + k, 2n − i − k) | B(i + k, 2n − i − k) |
|---|---|---|
| 0 | 0 | 2n |
| 1 | 2n − 1 | — |
| 2n − 1 | 2n − 1 | 2n |
| 2n | 0 | 0 |

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for approximating the shape of an object with a closed Bezier curve, comprising:
   receiving a specification for the shape of the object;
   producing an objective function for the area of a closed Bezier curve, wherein the objective function expresses the area of the closed Bezier curve as a function of the locations of control points that define the closed Bezier curve;
   using the specification for the shape of the object to generate exterior constraints for the closed Bezier curve, wherein the exterior constraints ensure that the closed Bezier curve remains on the exterior of the object; and
   minimizing the area of the closed Bezier curve subject to the exterior constraints to produce a minimum-area closed Bezier curve on the exterior of the object which encloses the shape of the object, wherein the minimum-area closed Bezier curve provides a mathematical representation that approximates the shape of the object.

2. The method of claim 1, wherein the method additionally involves:
   using the specification for the shape of the object to generate interior constraints for the closed Bezier curve, wherein the interior constraints ensure that the closed Bezier curve remains on the interior of the object; and
   maximizing the area of the closed Bezier curve subject to the interior constraints to produce a maximum-area closed Bezier curve on the interior of the object which is enclosed by the shape of the object.

3. The method of claim 1, wherein minimizing the area of the closed Bezier curve involves feeding the objective function and the exterior constraints into an optimization module.

4. The method of claim 3, wherein the optimization module uses interval-arithmetic-based techniques to solve constrained nonlinear optimization problems.

5. The method of claim 1,
   wherein producing the objective function involves choosing an initial number of control points for the closed Bezier curve; and
   wherein minimizing the area of the closed Bezier curve involves increasing the number of control points from the initial number until a termination condition is satisfied.

6. The method of claim 5, wherein the termination condition is satisfied when:
   the difference between the area of the minimum-area closed Bezier curve on the exterior of the object and the area of a maximum-area closed Bezier curve on the interior of the object falls below an acceptable difference; or
   the optimization program has performed a maximum amount of computational work without the difference in areas falling below the acceptable difference.

7. The method of claim 1, wherein the closed Bezier curve is described by parametric equations for x, y coordinates of the closed Bezier curve.

8. The method of claim 1, wherein generating the constraints additionally involves generating higher-order derivative constraints to achieve derivative continuity or smoothness in the resulting closed Bezier curve.

9. The method of claim 1, wherein receiving the specification for the shape of the object involves receiving:
   a pixilated representation of the object;
   an artists rendering of the object, which has been digitized; or
   a piecewise analytic function defining the boundary of the object.

10. A computer-readable storage medium storing instructions that when executed by a computer cause the computer to perform a method for approximating the shape of an object with a closed Bezier curve, the method comprising:
    receiving a specification for the shape of the object;
    producing an objective function for the area of a closed Bezier curve, wherein the objective function expresses the area of the closed Bezier curve as a function of the locations of control points that define the closed Bezier curve;
    using the specification for the shape of the object to generate exterior constraints for the closed Bezier curve, wherein the exterior constraints ensure that the closed Bezier curve remains on the exterior of the object; and
    minimizing the area of the closed Bezier curve subject to the exterior constraints to produce a minimum-area closed Bezier curve on the exterior of the object which encloses the shape of the object.

11. The computer-readable storage medium of claim 10, wherein the method additionally involves:
    using the specification for the shape of the object to generate interior constraints for the closed Bezier curve, wherein the interior constraints ensure that the closed Bezier curve remains on the interior of the object; and
    maximizing the area of the closed Bezier curve subject to the interior constraints to produce a maximum-area closed Bezier curve on the interior of the object which is enclosed by the shape of the object.

12. The computer-readable storage medium of claim 10, wherein minimizing the area of the closed Bezier curve involves feeding the objective function and the exterior constraints into an optimization module.

13. The computer-readable storage medium of claim 12, wherein the optimization module uses interval-arithmetic-based techniques to solve constrained nonlinear optimization problems.

14. The computer-readable storage medium of claim 10,
    wherein producing the objective function involves choosing an initial number of control points for the closed Bezier curve; and
    wherein minimizing the area of the closed Bezier curve involves increasing the number of control points from the initial number until a termination condition is satisfied.

15. The computer-readable storage medium of claim 14, wherein the termination condition is satisfied when:
    the difference between the area of the minimum-area closed Bezier curve on the exterior of the object and the area of a maximum-area closed Bezier curve on the interior of the object falls below an acceptable difference; or
    the optimization program has performed a maximum amount of computational work without the difference in areas falling below the acceptable difference.

16. The computer-readable storage medium of claim 10, wherein the closed Bezier curve is described by parametric equations for x, y coordinates of the closed Bezier curve.

17. The computer-readable storage medium of claim 10, wherein generating the constraints additionally involves generating higher-order derivative constraints to achieve derivative continuity or smoothness in the resulting closed Bezier curve.

18. The computer-readable storage medium of claim 10, wherein receiving the specification for the shape of the object involves receiving:
   a pixilated representation of the object;
   an artists rendering of the object, which has been digitized; or
   a piecewise analytic function defining the boundary of the object.

19. An apparatus for approximating the shape of an object with a closed Bezier curve, comprising:
   a receiving mechanism configured to receive a specification for the shape of the object;
   an objective function creation mechanism configured to create an objective function for the area of a closed Bezier curve, wherein the objective function expresses the area of the closed Bezier curve as a function of the locations of control points that define the closed Bezier curve;
   a constraint generation mechanism configured to use the specification for the shape of the object to generate exterior constraints for the closed Bezier curve, wherein the exterior constraints ensure that the closed Bezier curve remains on the exterior of the object; and
   an optimization mechanism configured to minimize the area of the closed Bezier curve subject to the exterior constraints to produce a minimum-area closed Bezier curve on the exterior of the object which encloses the shape of the object.

20. The apparatus of claim 19,
   wherein the constraint generation mechanism is additionally configured to use the specification for the shape of the object to generate interior constraints for the closed Bezier curve, wherein the interior constraints ensure that the closed Bezier curve remains on the interior of the object; and
   wherein the optimization mechanism is additionally configured to maximize the area of the closed Bezier curve subject to the interior constraints to produce a maximum-area closed Bezier curve on the interior of the object which is enclosed by the shape of the object.

* * * * *